Aug. 9, 1927.

J. O. WILSON

BABY WALKER

Filed Feb. 15, 1926    2 Sheets-Sheet 1

1,638,426

J. O. Wilson Inventor

By *CA Snow & Co.*

Attorneys

Aug. 9, 1927.　　　　　J. O. WILSON　　　　　1,638,426
BABY WALKER
Filed Feb. 15, 1926　　　2 Sheets-Sheet 2
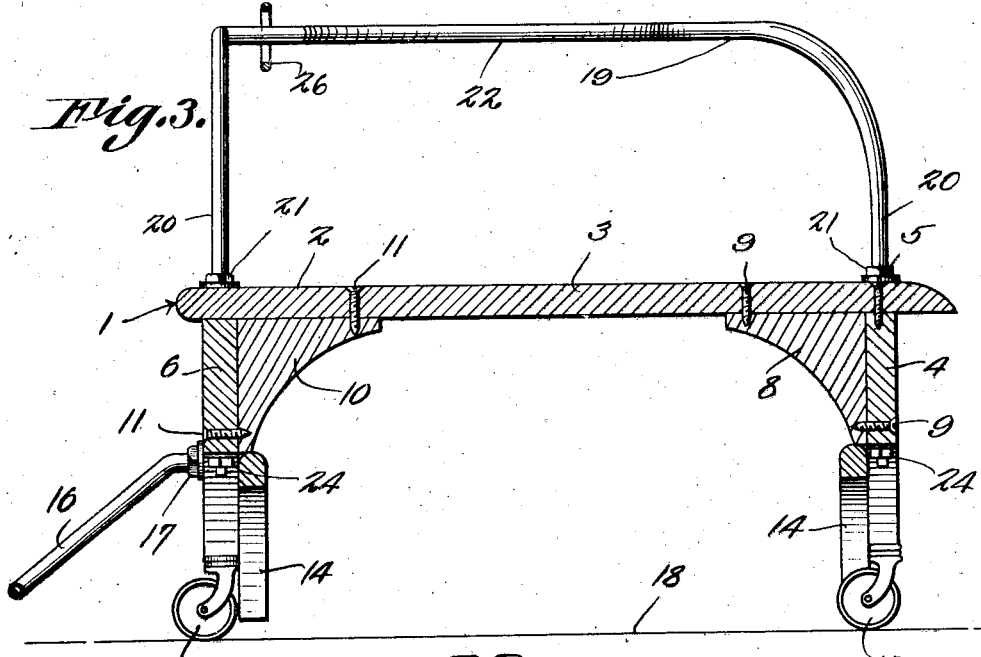
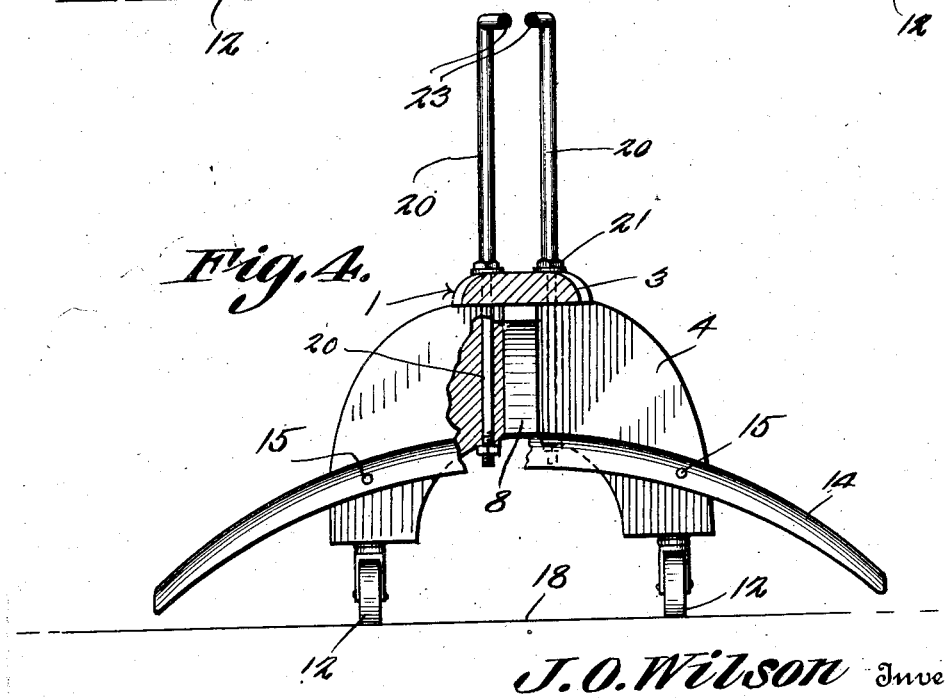
J. O. Wilson Inventor
By C. A. Snow & Co.
Attorneys.

Patented Aug. 9, 1927.

1,638,426

UNITED STATES PATENT OFFICE.

JAMES O. WILSON, OF STERLING, KANSAS, ASSIGNOR OF FORTY-NINE PER CENT TO GEORGE BROWN, OF STERLING, KANSAS.

BABY WALKER.

Application filed February 15, 1926. Serial No. 88,377.

This invention aims to provide a vehicle for use by infants, and so constructed that it cannot capsize either lengthwise or transversely, novel means being provided for holding the infant on the seat portion of the vehicle.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 3 is a longitudinal section;

Figure 4 is a transverse section taken about on the line 4—4 of Figure 2.

Figure 1:
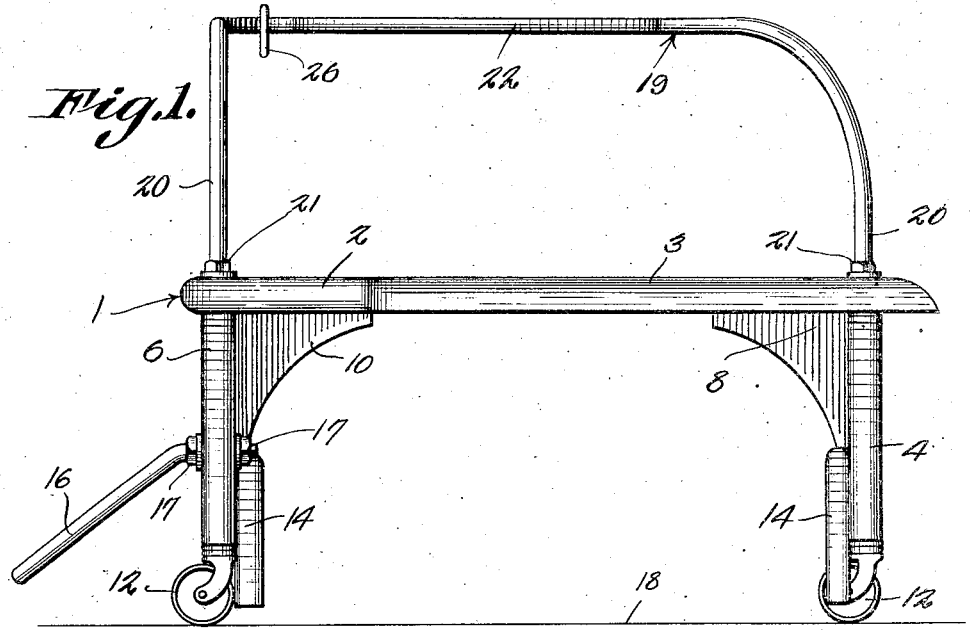
Figure 1 shows in side elevation, a device constructed in accordance with the invention.
Figure 2:
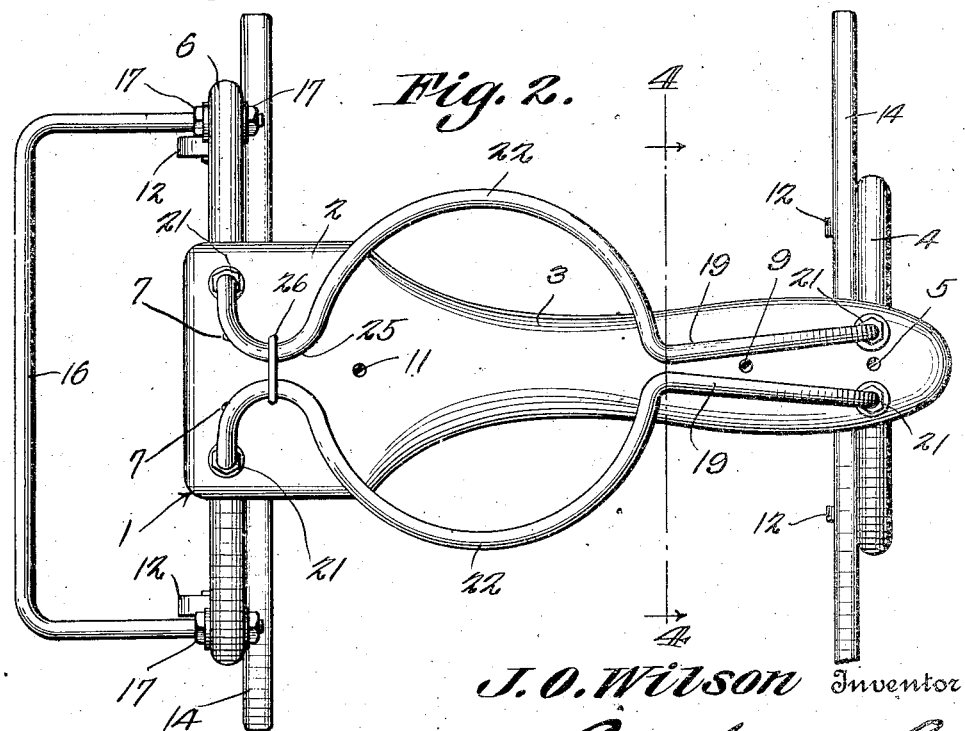
Figure 2 is a top plan.

In carrying out the invention, there is provided a seat 1 including a body 2 and a reduced extension 3. An arched front member 4 is attached by securing elements 5 to the extension 3 of the seat 1. An arched rear member 6, wider than the front member 4, is held by securing elements 7 on the body 2 of the seat 1. A brace 8 fits in the angle formed by the extension 3 and the front member 4, securing devices 9 connecting the parts 3 and 4 to the brace 8. A brace 10 fits in the angle formed by the rear member 6 and the body 2 of the seat 1, the brace 10 being held in place by securing elements 11 engaged with the parts 6 and 2. Caster wheels 12 are mounted on the front member 4 and on the rear member 6 in transversely spaced relation, the caster wheels being mounted to rotate on horizontal axes, and being mounted for movement about vertical axes, as is common, to obtain a swivelled effect. Curved supports 14 are attached by securing members 15 to the parts 4 and 6, the ends of the supports 14 being located outwardly of the parts 4 and 6, and being located above the plane 18 which is defined by the caster wheels 12. A downwardly inclined U-shaped prop 16 projects outwardly from the rear member 6 and extends lengthwise of the vehicle, the ends of the prop 16 being mounted in the part 6, and being held therein by nuts 17.

A retaining frame for the infant is provided, and includes two members 19 having depending ends 20 extended downwardly through the seat 1 and through the members 4 and 6. Nuts 21 are mounted on the parts 20 and engage the seat 1. Nuts 24 are threaded on the parts 20 and engage the members 4 and 6 in the concavities thereof, as Fig. 4 will show. The construction is such that great strength is afforded, and the taking down of the article for shipment is facilitated. The members 19 are bowed outwardly as at 22, to receive the body of the infant, when the infant straddles the extension 3 of the seat 1 and sits upon the seat. The members 19 and the prop 16 may each be enclosed within a tubular cover 23 of rubber or the like. Goose necks 25 are formed in the members 19 to the rear of the bowed parts 22, and, to prevent the members 19 from springing apart, the goose necks are connected by a link 26, which may be in the form of a ring.

It will be observed that the infant cannot tip the vehicle over backwardly, owing to the presence of the prop 16, nor can the infant turn the vehicle over sidewise, owing to the presence of the supports 14. It is to be observed that the supports 14 bear intermediate their ends on the lower portions of the brackets 8 and 10. This construction promotes strength.

What is claimed is:—

1. A device of the class described, comprising a seat, spaced front and rear members carried by and depending from the seat in transverse relation thereto, floor-engaging elements on the front and rear members, transverse supports secured at a plurality of points intermediate their ends to the transverse surfaces of the front and rear members to brace said members, the ends of the supports being disposed outwardly of the front and rear members, and above the plane defined by said floor-engaging elements, but close to that plane, to prevent the vehicle from tipping over sidewise, and a prop extended rearwardly and downwardly from the rear member, in the general direction of the length of the vehicle, and terminated so close to the plane defined by the casters, as to be effective in preventing the vehicle from tipping over endwise.

2. A vehicle of the class described, comprising a seat, front and rear members carried by the seat, a retaining device comprising oppositely bowed frames disposed above the seat and having depending ends extended downwardly through the seat and through the front and rear members, securing devices on the depending ends of the frames, casters on the front and rear members, and transverse supports secured to the front and rear members, the ends of the supports being located outwardly of the front and rear members, and above the plane defined by the casters, but closely adjacent to that plane, to prevent the vehicle from tipping over.

In testimony that I claim the foregoing as my own, I have hereto affixed my signature.

JAMES O. WILSON.